United States Patent [19]

Powell

[11] 4,013,111

[45] Mar. 22, 1977

[54] PNEUMATIC TIRE WITH REDUCED RATE OF INFLATION LOSS UPON BEING PUNCTURED

[75] Inventor: Joe Allen Powell, Norton, Ohio

[73] Assignee: The B. F. Goodrich Company, Akron, Ohio

[22] Filed: Dec. 15, 1975

[21] Appl. No.: 640,745

[52] U.S. Cl. .............................. 152/347; 152/310; 156/115

[51] Int. Cl.² ........................................ B60C 21/08

[58] Field of Search .......... 152/347, 348, 310, 311, 152/312; 156/115; 106/33; 428/912

[56] References Cited

UNITED STATES PATENTS

| | | | |
|---|---|---|---|
| 822,021 | 5/1906 | Sanderson | 152/310 |
| 3,022,810 | 2/1962 | Lambe | 152/310 |
| 3,227,664 | 1/1966 | Blades et al. | 152/310 |
| 3,628,585 | 12/1971 | Pace | 152/347 |
| 3,866,652 | 2/1975 | Ahmad | 152/310 |
| 3,920,061 | 11/1975 | Japp et al. | 152/347 |
| 3,935,893 | 3/1976 | Stang et al. | 428/912 |

Primary Examiner—Drayton E. Hoffman
Attorney, Agent, or Firm—Harry F. Pepper, Jr.; W. A. Shira, Jr.

[57] ABSTRACT

A pneumatic tire having a casing which defines in part an internal annular inflation chamber is provided with a small amount of low density, discrete, cellular, resilient, polymeric fibers within the inflation chamber to provide a reduction in the rate of inflation loss from the chamber upon puncture. Each fiber has many closed cells filled with gas and the polymer portion of each fiber is substantially all present as thin, filmy cellular walls. The fibers may be of varying length and may be added to the inflation chamber before or after tire is mounted on its rim.

10 Claims, 1 Drawing Figure

U.S. Patent
Mar. 22, 1977
4,013,111
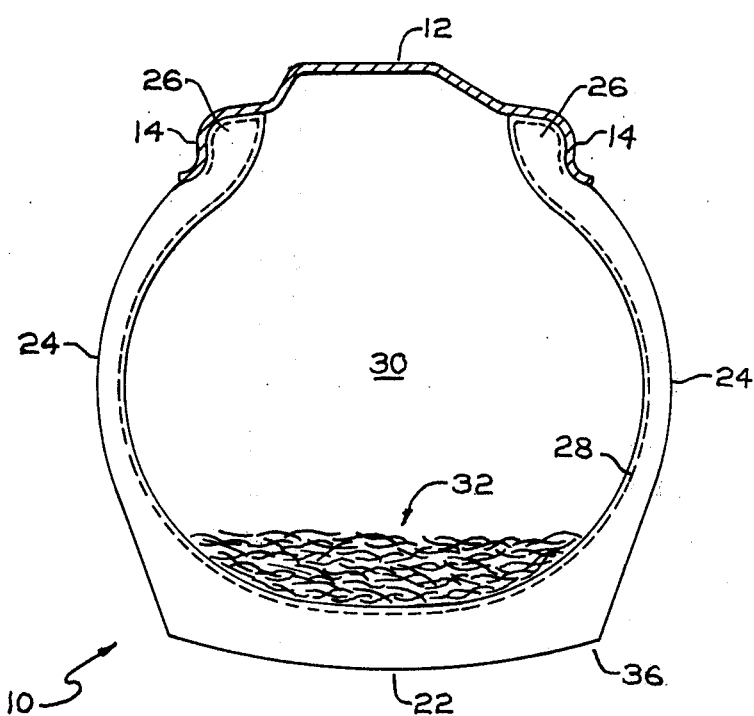

PNEUMATIC TIRE WITH REDUCED RATE OF INFLATION LOSS UPON BEING PUNCTURED

BACKGROUND OF THE INVENTION

This invention relates to pneumatic tires. This invention more specifically relates to pneumatic tires employing small amounts of low density, resilient, polymeric fibers within said tires' internal inflation chamber to permit operation of the tire for a limited time after being punctured.

In a conventional pneumatic tire, when a puncture occurs, a seal or "slow-leak" will usually result as long as the puncturing object remains in the tire. However, the puncturing object will not always remain in the tire. It is common for the puncturing object, usually a nail, to develop some movement as it strikes the road surface. This relative movement results in the puncture hole becoming larger and then the puncturing object will be thrown from the tire at highway speeds. When the puncturing object is extracted from the tire, the normal result is a rapid air loss. This rapid air loss can result in the loss of vehicle control by the driver.

For vehicle safety and motorist convenience, a pneumatic tire has historically been sought which has a means of retarding its deflation upon being punctured. Such a tire would reduce the frequency of tire changes on our high speed interstate highways, thereby resulting in increased safety for the motoring public. Because attention to vehicle safety is on the increase, many vehicle and tire manufacturers have become interested in equipping vehicles with pneumatic tires having the capability of a reduced rate of inflation loss after puncture. Some vehicle and tire manufacturers have become interested in equipping vehicles with such a tire in conjunction with a loss pressure warning device that would inform the motorist when the tire inflation pressure drops below a prescribed amount and then the "slow-leak" feature of such a tire would allow the motorist to take corrective action.

Various approaches to achieve a "slow-leak" pneumatic tire have been proposed without significant commercial success. Fluid puncture sealants which would flow into the puncture hole and either seal or partially seal the puncture hole have been somewhat unsuccessful because they tend to cause the tire to become out of balance. Because of the higher specific gravity of the fluid puncture sealants, if an amount sufficient to substantially restrict the flow of inflation gas through the puncture hole is added to the inside of the tire, then there is sufficient added weight to cause tire balance problems. Another known problem of the fluid sealants is that when the tire is turning at higher speeds, the fluid is concentrated under the center portion of the tread by centrifugal force and will not flow to a puncture hole in the outside contact regions of the tread commonly referred to as the shoulder region of the tread.

Another approach to achieve a "slow-leak" tire that has been proposed is to attach a layer of partially vulcanized elastomer on the inside of the tire, under the tread area, such that when the puncturing object is removed from the tire a small amount of the partially vulcanized elastomer will be pulled into the puncture hole. This partially vulcanized elastomer approach has not had significant commercial success because of manufacturing, technical, and enconomic problems associated with producing such a tire.

SUMMARY OF THE INVENTION

It is an object of the present invention to provide a "slow-leak" pneumatic tire which has an ability to partially seal a puncture hole.

It is a further object of the present invention to provide a pneumatic tire with small amounts of a low density, gas filled, resilient, cellular, polymeric fibers within the inflation chamber of the tire capable of partially sealing a puncture hole.

These and other objects, which will become evident from the subsequent description, are achieved by placing within the inflation chamber of a pneumatic tire a small amount of resilient micro-cellular fibers of synthetic organic polymer, each fiber having many gas-filled closed cells and substantially all of its polymer present as thin, filmy cellular walls. Upon puncture of the tire, the fibers are free to be drawn into the puncture hole by air currents caused by the escaping inflation air. The fibers are sufficiently low in density to be drawn into the puncture hole by the escaping inflation gas, particularly when the tire is not rotating or rotating at a relatively low speed. Once the fibers are drawn into the puncture hole, they reduce the size of the orifice thereby causing a significant reduction in the rate of inflation loss. Because of the low density of the fibers, tire balance is not significantly changed.

BRIEF DESCRIPTION OF THE DRAWINGS

The attached drawing shows a portion of a pneumatic tire in section containing a small amount of micro-cellular fibers, according to the invention, within its inflation chamber.

DETAILED DESCRIPTION OF PRESENTLY PREFERRED EMBODIMENTS

In the attached drawing, a pneumatic tire casing 10 is shown secured to a conventional rim 12 with axially spaced rim flanges 14. The casing 10 shown is of typical construction and includes an annular tread portion 22, a pair of axially spaced, annular sidewall portions 24 extending radially inwardly from tread portion 22 and a pair of axially spaced, annular bead portions 26. The bead portions are usually made stiff and rigid by circular inextensible bead cores or rings (not shown) embedded therein, so that tire casing 10 is secured to rim 12 in a sealed relationship. The tire casing 10 is reinforced by at least one carcass ply or layer 28 extending from bead portion to bead portion along sidewalls 24 and across tread portion 22. For illustration purposes, a region of tread portion 22 is designated as the shoulder region 36. The tire may or may not include typical circumferential belt reinforcement (not shown) in the vicinity of tread portion 22 as desired. The tire casing 10 and rim 12 enclose an annular inflation or air chamber 30. It is understood that the details of the tire casing 10 described are for purposes of illustration and are not of particular significance to the scope of the present invention, which, as will be evident from the following description, is not dependent upon any particular pneumatic tire construction.

The chamber 30 in the attached drawing is shown containing a small amount of low density, gas filled, resilient, micro-cellular fibers 32 (hereinafter "fibers"). These fibers 32 are capable of retarding the loss of inflation from chamber 30 upon puncture by being free to move to the location of the puncture and partially block the puncture hole. The fibers 32 are not adhered to the tire casing 10. These fibers 32 are essentially made in accordance with and are substantially similar to certain of the products described in U.S. Pat. No. 3,227,664. Specifically, each fiber 32 is an extruded micro-cellular structure of synthetic linear crystalline organic polymer in which substantially all of the polymer is present in a given fiber as thin, filmy, cellular walls. Also many, and preferably most, of the cells of each fiber 32 are closed and contain gas, or a mixture of gases, under pressure. The particular gas or gas mixture contained in the closed cells should be substantially impermeable to the polymer which comprises the cell walls of the fibers. The fibers 32 may be placed in the chamber 30 before the tire is mounted on its rim 12 or the fibers 32 can be added to the chamber 30 through the inflation port, known as a valve (not shown) after the tire is mounted on its rim 12.

Micro-cellular products made in accordance with the disclosure in the aforementioned U.S. Pat. No. 3,227,664, can have densities varying between about 0.3 lb./cu. ft. (0.005 g./cc.) to about 31 lb./cu. ft. (0.5 g./cc.). In accordance with the present invention, however, micro-cellular fibers 32 for use as an inflation loss retarder should be such that their individual densities do not exceed about 6 lb./cu. ft. (0.1 g./cc.). Micro-cellular fiber densities substantially above this magnitude are likely to adversely affect tire balance and also be too dense to be drawn into the puncture hole by the air currents.

An inflation loss retarder fiber according to the present invention found particularly suitable is one consisting essentially of micro-cellular polyester fibers with many closed cells containing a mixture of freon and air under pressure. These fibers can be made with densities of approximately one lb./cu. ft. (0.016 g./cc.) and with compressive strengths such as to remain essentially undamaged at 3000 psi. (204 atm.). These low density, high strength fibers are small (up to about 3 in. [7.62 cm.] long and up to about 0.05 in. [0.13 cm.] in diameter). Polyester fibers similar to the aforementioned are presently available cohered in sheet or batt form for use as rug underlay, and are known as "pneumacel" sold by DuPont.

For the purposes of this invention, the fibers should not be cohered in sheet or batt form. To adapt the commercially available "pneumacel" for use in this invention, the fibers can be released from their sheet form by applying sufficient heat to release the polymeric binder that holds the fibers together as a sheet. Once the "pneumacel" is in individual fiber form, it is suitable for application as an inflation loss retarder. Another method to adopt the commercially available "pneumacel" for use as an inflation loss retarder, is to chop or shred the pneumacel sheet into small pieces. The small fiber pieces are then suitable for use as an inflation loss retarder.

The fibers, as used in this invention, can be of varying lengths from their commercial size of up to about 3 in. (7.62 cm.) or in chopped form with fiber lengths as small as about 0.05 in. (0.13 cm.). The amount of fibers used per tire will vary with the size of the tire and can also vary in a specific size of tire. In a normal pneumatic passenger tire, the amount of fibers will vary from 0.1 oz. (2.8 g.) to 2 oz. (57 g.) with the preferred amount of fibers being in the range of 0.25 oz. (7.0 g.) to 0.5 oz. (14.0 g.). In a normal pneumatic passenger tire, the volume occupied by the fibers will be from 0.5% to 10% of the volume of the inflation chamber with the preferred volume of fibers occupying from 1% to 3% of the volume of the tire inflation chamber. In pneumatic tire applications where balance is not critical, such as non-passenger tires, the amount of fibers added to the inflation chamber can be greater. The primary reason for the preferred amount of fibers being in the range of 0.25 oz. (7.0 g.) to 0.5 oz. (14.0 g.) is because at this small amount of weight, tire balance will not be adversely affected. Fibers occupying greater than 10% of the volume of the inflation chamber will also perform as an inflation loss retarder, however, the weight of such a large amount of fibers would cause tire balance problems.

The practice of this invention is further illustrated by reference to the following examples which are intended to be representative rather than restrictive of the scope of the invention.

EXAMPLE I 0.5 oz. (14.0 g.) of "pneumacel" fibers were chopped such that substantially all of the fibers were from 0.05 in. (0.13 cm.) to 0.5 in. (1.27 cm.) in length. These fibers were then placed in the inflation chamber of a conventional GR78-15 pneumatic passenger tire. The tire was mounted on a conventional rim and inflated to 25 psig. The tire was then tested by driving a 0.185 inch diameter 20-penny nail through its tread portion, following which the nail was removed. A control tire, with no fibers in the inflation chamber, was mounted on a conventional rim and inflated to 25 psig. The control tire was then tested by driving a 0.185 inch diameter 20-penny nail through its tread portion, following which the nail was removed. Table 1 shows a comparison of the static pressure loss of the experimental tire with fibers versus the control tire without fibers.

TABLE 1

| | STATIC PRESSURE LOSS | |
|---|---|---|
| | Experimental Tire | Control Tire |
| Initial Tire Inflation (psig.) 0 minutes | 25 | 25 |
| Inflation maintained after 10 minutes (psig.) | 21 | 0 |
| Inflation maintained after 20 minutes (psig.) | 19 | 0 |
| Inflation maintained after 48 minutes (psig.) | 14 | 0 |

Table 1 represents that the experimental tire with fibers had a slower rate of inflation loss than the control tire without fibers. Upon terminating this test, the tire containing the fibers was sectioned in the area of the puncture and it was observed that fibers were lodged in the puncture hole.

EXAMPLE II 0.5 oz. (14.0 g.) of "pneumacel" fibers was prepared in chopped form as in Example I. These fibers were then placed in the inflation chamber of a conventional GR78-15 pneumatic passenger tire. The tire was mounted on a conventional rim and inflated to 24 psig. The tire-wheel assembly was then mounted on the left, front position of an automobile. The tire was then tested by driving over a 0.185 inch diameter 20-penny nail such that the nail punctured the tire casing in the shoulder region of the tread. The nail was not pulled from the tire at this time, but was allowed to be thrown out of the tire at highway speeds of up to 60 miles per hour (96.5 km./hr.) and the inflation loss was effectively retarded. A control tire, with no fibers in the inflaction chamber, was mounted on a conventional rim and inflated to 24 psig. The control tire-wheel assembly was then mounted on the right, front position of an automobile. The control tire was then tested by driving over a 0.185 inch diameter 20-penny nail such that the nail punctured the tire casing in the shoulder region of the tread. The nail was not pulled from the tire at this time, but was allowed to be thrown out of the tire at highway speeds of up to 60 miles per hour (96.5 km./hr.). Table 2 shows a comparison of the dynamic pressure loss of the experimental tire with fibers versus the control tire without fibers.

TABLE 2

| DYNAMIC PRESSURE LOSS | | |
|---|---|---|
| | Experimental Tire | Control Tire |
| Initial Tire Inflation 0 miles (psig.) | 24 | 24 |
| After 20 miles, the nail was dynamically thrown from control tire | | |
| Inflation maintained after 20.5 miles (psig.) | 24 | (control tire 0 replaced with spare) |
| After 25 miles, the nail was dynamically thrown from experimental tire | | |
| Inflation maintained after 29.6 miles (psig.) | 7 | — |
| Inflation maintained after 39 miles (psig.) | 2 | — |

Table 2 represents that when the nail is dynamically thrown from the tire, the experimental tire with fibers has a slower rate of inflation loss than the control tire without fibers. As in Example I, fibers were observed in the puncture hole of the experimental tire containing fibers.

The two examples above show that there is a retardation effect on the inflation pressure loss upon puncture by the use of the above mentioned fibers in the tire's inflation chamber.

It is clear from the foregoing that there are several distinct advantages to be gained by using these micro-cellular fiber inside the inflation chamber of a pneumatic tire to retard the rate of inflation loss in accordance with the present invention. It is understood that the foregoing describes the invention in terms of presently preferred embodiments with obvious departures from and modifications to these embodiments considered to fall within the scope of the invention as measured by the following claims.

I claim:

1. In a pneumatic tire having a casing, an annular, inner inflation chamber defined in part by said casing and means within said chamber to retard the rate of inflation loss upon puncture, the improvement wherein said means consists essentially of micro-cellular, discrete, loose fibers of synthetic, organic polymer composition, each of the fibers characterized by:
   a. a plurality of closed, gas-filled cells;
   b. substantially all of its polymer being present as thin, cellular walls, and
   c. a density no greater than about 6 lb./cu. ft. (0.09 g./cc.), said fibers occupying from 0.5% to 10% of the inflation chamber's volume.

2. The improvement defined in claim 1 in which each fiber has a density of about one lb./cu. ft. (0.016 g./cc.).

3. The improvement defined in claim 1 wherein the total weight of fibers in each tire's inflation chamber is from about 0.1 oz. (2.8 g.) to about 2 oz. (57.0 g.).

4. The improvement defined in claim 1 wherein each fiber has a length from about 0.05 in. (0.13 cm.) to about 3 in. (7.62 cm.) and a diameter no greater than about 0.05 in. (0.13 cm.).

5. The improvement defined in claim 4 wherein each fiber has a density of about one lb./cu. ft. (0.016 g./cc.).

6. The improvement defined in claim 1 in which said fibers are polyester.

7. The improvement defined in claim 6 wherein each fiber has a density of about one lb./cu. ft. (0.016 g./cc.).

8. The improvement defined in claim 6 wherein each fiber has a length from about 0.05 in. (0.13 cm.) to about 3 inches (7.62 cm.) and a diameter no greater than about 0.05 in. (0.13 cm.).

9. The improvement in claim 8 wherein each fiber has a density of about one lb./cu. ft. (0.016 g./cc.).

10. The improvement defined in claim 8 wherein the total weight of fibers placed in each tire's inflation chamber is from about 0.1 oz. (2.8 g.) to about 2 oz. (57.0 g.).

* * * * *